United States Patent
Huang et al.

(10) Patent No.: US 9,862,882 B2
(45) Date of Patent: Jan. 9, 2018

(54) FOAM ASSISTED LIQUID REMOVAL USING ALCOHOL ETHER SULFONATES

(71) Applicant: Ecolab USA Inc., St. Paul, MN (US)

(72) Inventors: Fenfen Huang, Sugar Land, TX (US); Duy T. Nguyen, Sugar Land, TX (US)

(73) Assignee: Ecolab USA Inc., St. Paul, MN (US)

(*) Notice: Subject to any disclaimer, the term of this patent is extended or adjusted under 35 U.S.C. 154(b) by 0 days.

(21) Appl. No.: 15/057,772

(22) Filed: Mar. 1, 2016

(65) Prior Publication Data

US 2016/0257879 A1 Sep. 8, 2016

Related U.S. Application Data

(60) Provisional application No. 62/127,448, filed on Mar. 3, 2015.

(51) Int. Cl.

| | |
|---|---|
| *E21B 37/06* | (2006.01) |
| *C09K 8/94* | (2006.01) |
| *C09K 8/60* | (2006.01) |
| *C09K 8/86* | (2006.01) |
| *E21B 43/16* | (2006.01) |
| *E21B 43/12* | (2006.01) |
| *C09K 8/584* | (2006.01) |
| *C09K 8/594* | (2006.01) |

(52) U.S. Cl.
CPC ............... *C09K 8/94* (2013.01); *C09K 8/584* (2013.01); *C09K 8/602* (2013.01); *C09K 8/86* (2013.01); *E21B 37/06* (2013.01); *E21B 43/121* (2013.01); *E21B 43/168* (2013.01); *C09K 8/594* (2013.01); *C09K 2208/20* (2013.01); *C09K 2208/22* (2013.01); *C09K 2208/28* (2013.01); *C09K 2208/32* (2013.01)

(58) Field of Classification Search
CPC .......... C09K 8/94; C09K 8/584; C09K 8/594; C09K 8/86; C09K 2208/20; C09K 2208/22; C09K 2208/32; E21B 37/06; E21B 43/168

USPC .............................................. 166/304, 308.1
See application file for complete search history.

(56) References Cited

U.S. PATENT DOCUMENTS

| | | | |
|---|---|---|---|
| 4,370,243 A | 1/1983 | Chen et al. | |
| 5,058,678 A | 10/1991 | Dill et al. | |
| 5,104,585 A | 4/1992 | Fabry et al. | |
| 5,318,709 A | 6/1994 | Wuest et al. | |
| 6,333,005 B1* | 12/2001 | Nguyen ............ | C02F 5/00 422/13 |
| 7,629,299 B2 | 12/2009 | Berger et al. | |
| 7,776,798 B2 | 8/2010 | Subramanian et al. | |
| 8,403,044 B2* | 3/2013 | Hutchison .......... | C07C 303/06 166/270.1 |
| 2004/0127742 A1 | 7/2004 | Anantaneni et al. | |
| 2008/0176772 A1* | 7/2008 | Berger .............. | C09K 8/584 507/255 |
| 2008/0217009 A1 | 9/2008 | Yang | |
| 2008/0302531 A1* | 12/2008 | Berger .............. | C09K 8/584 166/270.1 |
| 2014/0262297 A1 | 9/2014 | Huang | |
| 2015/0275634 A1* | 10/2015 | Nguyen ............. | C09K 8/584 166/308.2 |

FOREIGN PATENT DOCUMENTS

| | | |
|---|---|---|
| EP | 0 455 657 B1 | 7/1993 |
| WO | 2013/162924 A1 | 10/2013 |

OTHER PUBLICATIONS

International Search Report and Written Opinion issued for PCT/US2016/020251, dated Jul. 14, 2016, 9 pages.
"Synthesis and Application of High Molecular Weight Surfactants," Presentation by Oil Chem Technologies, 104th AOCS Annual Meeting & Expo, Apr. 28-May 1, 2013, 29 pages.

* cited by examiner

*Primary Examiner* — Silvana Runyan
(74) *Attorney, Agent, or Firm* — Senniger Powers LLP

(57) ABSTRACT

A composition comprising an alcohol ether sulfonate is provided for use in methods of removing a fluid from a subterranean hydrocarbon-containing formation.

21 Claims, No Drawings

FOAM ASSISTED LIQUID REMOVAL USING ALCOHOL ETHER SULFONATES

CROSS-REFERENCE TO RELATED APPLICATIONS

This application claims the benefit of U.S. Provisional Patent Application Ser. No. 62/127,448, filed Mar. 3, 2015, the entirety of which is incorporated herein by reference.

FIELD OF THE INVENTION

The present invention generally relates to compositions and methods for removing fluid containing crude oil or natural gas from wells, wellbores and pipelines during oil and gas production and transportation. More specifically, the fluid is removed using compositions which comprise an alcohol ether sulfonate surfactant to minimize liquid loading in the wells, wellbores, and pipelines.

BACKGROUND OF THE INVENTION

Liquid loading is a widely encountered phenomenon in natural oil and gas well production, and in wet gas and hydrocarbon transmission pipelines in the oil and gas industry. In natural gas or oil production, as a reservoir is depleted over the production cycle, decreasing formation pressure and gas velocity causes the production rate of gas or oil to decline. As a result, produced liquid might not be lifted out of the well and may accumulate in the wellbore and production tubing. The hydrostatic pressure associated with the liquid column will in turn hinder production and in some cases, even cause production to cease. The low flow-rate in operating gas or hydrocarbon pipelines can lead to significant liquid accumulation as well due to the action of gravity or vapor condensation coupled with the undulating trajectory of the gas transport pipeline. The liquid accumulation not only restricts production or transportation, but also leads to undesired outcomes such as increased corrosion to the asset (e.g., pipeline or production equipment). Effective removal of the liquid maximizes production and transmission efficiency and reduces the risk of corrosion.

Various methods are used to minimize liquid loading, including the use of velocity strings, intermitters, additional compressors, and liquid foaming agents.

Liquid foaming agents, also known as foamers, are commonly used to aid in unloading liquid from transport pipelines and from natural gas and oil wells where naturally occurring gas or injected gas is present. Foamers can be applied either by batch treatment or continuous application. With the addition of foamer to the wellbore where the loading liquids are present, foam is generated with the agitation from the gas flow. The surface tension and fluid density of the foam are lower than that of the liquids so the lighter foam, whose bubble film holds the liquids, is more easily lifted by the low gas flow rate. In oil well production, foamers are also used in conjunction with a gas lift system to enhance oil production. Foamers are also used in conjunction with a lift gas to enhance oil recovery from the oil well. In gas pipelines, foamers are used to introduce foam to sweep the liquid accumulation.

US 2006/0128990 describes a method of treating a gas well comprising a chloride free amphoteric surfactant. U.S. Pat. No. 7,122,509 provides a method of preparing a foamer composition having an anionic surfactant and a neutralizing amine. US 2005/0137114 discloses an aqueous foaming composition comprising at least one anionic surfactant, cationic surfactant and at least one zwitterionic compound. WO 02/092963 and US 2007/0079963 disclose a method for recovering oil from a gas-lifted oil well using a lift gas and a foaming surfactant which consists of nonionic surfactants, anionic surfactants, betaines, and siloxanes. U.S. Pat. No. 8,551,925 describes quaternized imidazoline-based foamers for enhancing oil and gas production and inhibiting corrosion. US patent application US 2012/0279715 discloses applying quaternary foamers to relieve liquid loading and mitigate corrosion in oil and gas production and transport.

While such foamers contribute significantly to deliquifying gas and oil wells, there remains a need for other cost-effective foamers which could provide superior performance in unloading hydrocarbon, water or mixtures thereof from wells and transport pipelines.

SUMMARY OF THE INVENTION

A method of recovering a fluid from a gas or oil well, a wellbore, or a pipeline is provided. The method comprises introducing a composition into a gas well, an oil well, a wellbore, or a pipeline in an amount effective for foaming a fluid within the well, the wellbore, or the pipeline to recover the fluid from the well, the wellbore, or the pipeline. The fluid comprises a hydrocarbon, water or a combination thereof. The composition comprises an alcohol ether sulfonate having formula I:

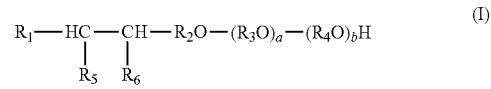

wherein:
$R_1$ is alkyl;
$R_2$ is alkylene;
$R_3$ and $R_4$ are each independently ethylene or propylene;
$R_5$ is hydroxyl and $R_6$ is $—SO_3M$, or $R_5$ is $—SO_3M$ and $R_6$ is hydroxyl;
M is independently an alkali metal, an alkaline earth metal, hydronium, $NH_3$ or $NH_2$; and
a and b are each independently an integer from 0 to 30, and a+b equals 1 to 60.

Other objects and features will be in part apparent and in part pointed out hereinafter.

DESCRIPTION OF THE PREFERRED EMBODIMENTS

It has been discovered that certain alcohol ether surfactants are more effective in recovering a fluid from a gas or oil well, a wellbore, or a pipeline, as compared to conventional surfactants used for this purpose.

A method is provided for recovering a fluid from a gas or oil well, a wellbore, or a pipeline. The method comprises introducing a composition into the gas well, the oil well, the wellbore, or the pipeline in an amount effective for foaming a fluid within the well, the wellbore, or the pipeline to recover the fluid from the well or the pipeline. The fluid comprises a hydrocarbon, water or a combination thereof. The composition comprises an alcohol ether sulfonate.

A composition for recovering a fluid from a gas or oil well, a wellbore, or a pipeline is provided, the composition comprising an alcohol ether sulfonate. The alcohol ether sulfonate of the composition has formula I:

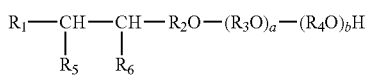

(I)

wherein:
R$_1$ is alkyl;
R$_2$ is alkylene;
R$_3$ and R$_4$ are each independently ethylene or propylene;
R$_5$ is hydroxyl and R$_6$ is —SO$_3$M, or R$_5$ is —SO$_3$M and R$_6$ is hydroxyl;
M is independently an alkali metal, an alkaline earth metal, hydronium, NH$_3$ or NH$_2$; and
a and b are each independently an integer from 0 to 30, and a+b equals 1 to 60.

Preferably, the alcohol ether sulfonate of the composition has the formula II

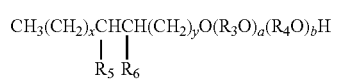

(II)

wherein:
R$_3$ is isopropylene and R$_4$ is ethylene, or R$_3$ is ethylene and R$_4$ is isopropylene,
R$_5$ is hydroxyl and R$_6$ is —SO$_3$M, or R$_5$ is —SO$_3$M and R$_6$ is hydroxyl;
M is independently Na, K, Ca, Mg, hydronium, NH$_3$ or NH$_2$;
x and y are each independently an integer from 0 to 27, and x+y equals 5 to 27; and
a and b are each independently an integer from 0 to 30, and a+b equals 1 to 60.

It is preferred that each R$_3$ is isopropylene and R$_4$ is ethylene.

R$_5$ can be hydroxyl and R$_6$ can be —SO$_3$M. Alternatively, R$_5$ can be —SO$_3$M and R$_6$ can be hydroxyl.

For the alcohol ether sulfonate of formula II, x and y each can be independently an integer from 0 to 15, and x+y can be equal to 5 to 15. Preferably, x can be 7 and y can be 8 (i.e., the alcohol portion of the compound is derived from oleyl alcohol).

For the alcohol ether sulfonate of formula I or II, a can be 2 to 25, b can be 2 to 25, and a+b can equal 4 to 50. Alternatively, a is 3 to 20, b is 6 to 20, and a+b equals 9 to 40. As another alternative, a is 5 to 18, b is 10 to 12, and a+b equals 15 to 30. Preferably, a is 18, b is 10, and a+b equals 28.

The alcohol ether sulfonate is preferably water soluble, biodegradable, thermally stable (i.e., stable at temperatures encountered in subterranean hydrocarbon formations), salt tolerant and/or is manufactured from renewable resources.

Alcohol ether sulfonate surfactants of formula I or II are commercially available from Oil Chem Technologies of Sugar Land, Tex., and can be manufactured by known methods such as those described in U.S. Pat. No. 7,629,299.

The composition can further comprise a carrier, such as a liquid carrier. The carrier can increase liquid unloading efficiency, reduce viscosity, lower the freezing point of the foaming agent, and improve compatibility with other components of the composition. Preferably, the carrier comprises water, an alcohol, an ether, a glycol, a glycol ether, or a combination thereof. For example, the carrier can include, but is not limited to, methanol, ethanol, isopropanol, butoxyethanol, 2-ethylhexanol, ethylene glycol, propylene glycol, methyl ether ethylene glycol, heavy aromatic naphtha, diesel, toluene, ethylenebenzene, ethylene glycol monobutyl ether, diethylene glycol monoethyl ether, xylene, or a combination thereof. Representative polar solvents suitable for formulation with the composition include water, brine, seawater, alcohols (including straight chain or branched aliphatic such as methanol, ethanol, propanol, isopropanol, butanol, 2-ethylhexanol, hexanol, octanol, decanol, 2-butoxyethanol, etc.), glycols and derivatives (ethylene glycol, 1,2-propylene glycol, 1,3-propylene glycol, ethylene glycol monobutyl ether, etc.), ketones (cyclohexanone, diisobutylketone), N-methylpyrrolidinone (NMP), N,N-dimethylformamide and the like. Representative of non-polar solvents suitable for formulation with the composition include aliphatics such as pentane, hexane, cyclohexane, methylcyclohexane, heptane, decane, dodecane, diesel, and the like; aromatics such as toluene, xylenes, heavy aromatic naphtha, fatty acid derivatives (acids, esters, amides), and the like.

The composition can be provided as a concentrate for dilution prior to use, or in dilute form by incorporating a carrier in the composition.

The composition can also include one or more oil field additives such as, for example, corrosion inhibitors, scale inhibitors, emulsifiers, water clarifiers, dispersants, emulsion breakers, hydrogen sulfide scavengers, gas hydrate inhibitors, biocides, pH modifiers, surfactants, synergistic compounds, asphaltene inhibitors, paraffin inhibitors, antioxidants, pour point depressants, viscosity modifiers, flow back aids, friction reducers, crosslinking agents, or proppants (e.g., sand). Unless otherwise specified, these additives typically are less than 1% of the fluid volume. Such additives can be introduced into the well, wellbore or pipeline before, during or after the introduction of the alcohol ether sulfonate, or can be a component of the composition.

The composition may further comprise a corrosion inhibitor. Suitable corrosion inhibitors include, but are not limited to, amidoamines, quaternary amines, amides, and phosphate esters.

The composition may further comprise a scale inhibitor. Suitable scale inhibitors include, but are not limited to, phosphates, phosphate esters, phosphoric acids, phosphonates, phosphonic acids, polyacrylamides, salts of acrylamido-methyl propane sulfonate/acrylic acid copolymer (AMPS/AA), phosphinated maleic copolymer (PHOS/MA), and salts of a polymaleic acid/acrylic acid/acrylamidomethyl propane sulfonate terpolymer (PMA/AMPS).

The composition may further comprise an emulsifier. Suitable emulsifiers include, but are not limited to, salts of carboxylic acids, products of acylation reactions between carboxylic acids or carboxylic anhydrides and amines, and alkyl, acyl and amide derivatives of saccharides (alkylsaccharide emulsifiers).

The composition may further comprise a water clarifier. Suitable water clarifiers include, but are not limited to, inorganic metal salts such as alum, aluminum chloride, and aluminum chlorohydrate, or organic polymers such as acrylic acid based polymers, acrylamide based polymers, polymerized amines, alkanolamines, thiocarbamates, and cationic polymers such as diallyldimethylammonium chloride (DADMAC).

The composition may further comprise a dispersant. Suitable dispersants include, but are not limited to, aliphatic phosphonic acids with 2-50 carbons, such as hydroxyethyl diphosphonic acid, and aminoalkyl phosphonic acids, e.g. polyaminomethylene phosphonates with 2-10 N atoms e.g.

each bearing at least one methylene phosphonic acid group; examples of the latter are ethylenediamine tetra(methylene phosphonate), diethylenetriamine penta(methylene phosphonate) and the triamine- and tetramine-polymethylene phosphonates with 2-4 methylene groups between each N atom, at least 2 of the numbers of methylene groups in each phosphonate being different. Other suitable dispersion agents include lignin or derivatives of lignin such as lignosulfonate and naphthalene sulfonic acid and derivatives.

The composition may further comprise an emulsion breaker. Suitable emulsion breakers include, but are not limited to, dodecylbenzylsulfonic acid (DDBSA), the sodium salt of xylene sulfonic acid (NAXSA), epoxylated and propoxylated compounds, anionic cationic and nonionic surfactants, and resins, such as phenolic and epoxide resins.

The composition may further comprise a hydrogen sulfide scavenger. Suitable additional hydrogen sulfide scavengers include, but are not limited to, oxidants (e.g., inorganic peroxides such as sodium peroxide, or chlorine dioxide), aldehydes (e.g., of 1-10 carbons such as formaldehyde or glutaraldehyde or (meth)acrolein), triazines (e.g., monoethanol amine triazine, and monomethylamine triazine), and glyoxal.

The composition may further comprise a gas hydrate inhibitor. Suitable gas hydrate inhibitors include, but are not limited to, thermodynamic inhibitors (THI), kinetic inhibitors (KHI), and anti-agglomerates (AA). Suitable thermodynamic inhibitors include, but are not limited to, NaCl salt, KCl salt, $CaCl_2$ salt, $MgCl_2$ salt, $NaBr_2$ salt, formate brines (e.g. potassium formate), polyols (such as glucose, sucrose, fructose, maltose, lactose, gluconate, monoethylene glycol, diethylene glycol, triethylene glycol, mono-propylene glycol, dipropylene glycol, tripropylene glycols, tetrapropylene glycol, monobutylene glycol, dibutylene glycol, tributylene glycol, glycerol, diglycerol, triglycerol, and sugar alcohols (e.g. sorbitol, mannitol), methanol, propanol, ethanol, glycol ethers (such as diethyleneglycol monomethyl ether, ethylene glycol monobutyl ether), and alkyl or cyclic esters of alcohols (such as ethyl lactate, butyl lactate, methylethyl benzoate). Suitable kinetic inhibitors and anti-agglomerates include, but are not limited to, polymers and copolymers, polysaccharides (such as hydroxy-ethylcellulose (HEC), carboxymethylcellulose (CMC), starch, starch derivatives, and xanthan), lactams (such as polyvinylcaprolactam, polyvinyl lactam), pyrrolidones (such as polyvinyl pyrrolidone of various molecular weights), surfactants (such as fatty acid salts, ethoxylated alcohols, propoxylated alcohols, sorbitan esters, ethoxylated sorbitan esters, polyglycerol esters of fatty acids, alkyl glucosides, alkyl polyglucosides, alkyl sulfates, alkyl sulfonates, alkyl ester sulfonates, alkyl aromatic sulfonates, alkyl betaine, alkyl amido betaines), hydrocarbon based dispersants (such as lignosulfonates, iminodisuccinates, polyaspartates), amino acids, and proteins.

The composition may further comprise a biocide. Any biocide suitable in oilfield operations may be used. A biocide may be included in a composition in an amount of about 0.1 ppm to about 1000 ppm. Suitable biocides include, but are not limited to, oxidizing and non-oxidizing biocides. Suitable non-oxidizing biocides include, for example amine-type compounds (e.g., quaternary amine compounds and cocodiamine), halogenated compounds (e.g., bronopol and 2-2-dibromo-3-nitrilopropionamide (DBNPA)), sulfur compounds (e.g., isothiazolone, carbamates, and metronidazole), and quaternary phosphonium salts (e.g., tetrakis(hydroxymethyl)phosphonium sulfate (THPS)). Suitable oxidizing biocides include, for example, sodium hypochlorite, trichloroisocyanuric acids, dichloroisocyanuric acid, calcium hypochlorite, lithium hypochlorite, chlorinated hydantoins, stabilized sodium hypobromite, activated sodium bromide, brominated hydantoins, chlorine dioxide, ozone, and peroxides.

The composition may further comprise a pH modifier. Suitable pH modifiers include, but are not limited to, alkali hydroxides, alkali carbonates, alkali bicarbonates, alkaline earth metal hydroxides, alkaline earth metal carbonates, alkaline earth metal bicarbonates and mixtures or combinations thereof. Exemplary pH modifiers include NaOH, KOH, $Ca(OH)_2$, CaO, $Na_2CO_3$, $KHCO_3$, $K_2CO_3$, $NaHCO_3$, MgO, and $Mg(OH)_2$.

The composition may further comprise a synergistic compound. Suitable synergistic compounds include compounds that enhance the hydrogen sulfide scavenging performance of the composition. For example, the synergistic compound may be a quaternary ammonium compound, an amine oxide, an ionic or non-ionic surfactant, or any combination thereof. Suitable quaternary amine compounds include, but are not limited to, alkyl benzyl ammonium chloride, benzyl cocoalkyl($C_{12}$-$C_{18}$)dimethylammonium chloride, dicocoalkyl($C_{12}$-$C_{18}$)dimethylammonium chloride, ditallow dimethylammonium chloride, di(hydrogenated tallow alkyl) dimethyl quaternary ammonium methyl chloride, methyl bis(2-hydroxyethyl cocoalkyl($C_{12}$-$C_{18}$) quaternary ammonium chloride, dimethyl(2-ethyl) tallow ammonium methyl sulfate, n-dodecylbenzyldimethylammonium chloride, n-octadecylbenzyldimethyl ammonium chloride, n-dodecyltrimethylammonium sulfate, soya alkyltrimethylammonium chloride, and hydrogenated tallow alkyl (2-ethylhexyl)dimethyl quaternary ammonium methyl sulfate. Suitable amine oxide compounds include, but are not limited to, fatty amine oxides such as steelyl dimethylamine oxide, lauryldimethylamine oxide, and cocamidopropylamine oxide, or etheramine oxides such as bis-(2-hydroxyethyl)isodecyloxypropylamine oxide. Suitable nonionic surfactants include, but are not limited to, polyoxyethylene glycol alkyl ethers, polyoxypropyleneglycol alkyl ethers, polyoxyethyleneglycol nonylphenol ethers, poloxamers, cocamide diethanolamine, and polyethoxylated tallow amine. The synergist compound(s) may be present from about 0.01 to about 20 percent by weight, preferably from about 1 to about 10 percent by weight, from about 2 to about 9 percent by weight, from about 3 percent to about 8 percent by weight, from about 4 percent to about 7 percent by weight, or from about 5 percent to about 6 percent by weight. The synergist compound may be added to a fluid or gas simultaneously with the fluid, or may be added separately.

The composition may further comprise an asphaltene inhibitor. Suitable asphaltene inhibitors include, but are not limited to, aliphatic sulfonic acids; alkyl aryl sulfonic acids; aryl sulfonates; lignosulfonates; alkylphenol/aldehyde resins and similar sulfonated resins; polyolefin esters; polyolefin imides; polyolefin esters with alkyl, alkylenephenyl or alkylenepyridyl functional groups; polyolefin amides; polyolefin amides with alkyl, alkylenephenyl or alkylenepyridyl functional groups; polyolefin imides with alkyl, alkylenephenyl or alkylenepyridyl functional groups; alkenyl/vinyl pyrrolidone copolymers; graft polymers of polyolefins with maleic anhydride or vinyl imidazole; hyperbranched polyester amides; polyalkoxylated asphaltenes, amphoteric fatty acids, salts of alkyl succinates, sorbitan monooleate, and polyisobutylene succinic anhydride.

The composition may further comprise a paraffin inhibitor. Suitable paraffin inhibitors include, but are not limited to, paraffin crystal modifiers, and dispersant/crystal modifier combinations. Suitable paraffin crystal modifiers include, but are not limited to, alkyl acrylate copolymers, alkyl acrylate vinylpyridine copolymers, ethylene vinyl acetate copolymers, maleic anhydride ester copolymers, branched polyethylenes, naphthalene, anthracene, microcrystalline wax and/or asphaltenes. Suitable dispersants include, but are not limited to, dodecyl benzene sulfonate, oxyalkylated alkylphenols, and oxyalkylated alkylphenolic resins.

The composition may further comprise an antioxidant. Any antioxidant suitable in oilfield operations may be used. Exemplary antioxidants include but are not limited to sulfites, thiocyanates and thiosulfates. An antioxidant may be included in a composition in an amount of about 1 ppm to about 1000 ppm.

The composition can also include one or more additional foaming agents such as an additional anionic surfactant, a cationic surfactant, a nonionic surfactant, an amphoteric surfactant, or a zwitterionic surfactant. Such additives can be introduced into the well, wellbore or pipeline before, during or after the introduction of the alcohol ether sulfonate, or can be a component of the composition.

The composition is used in an amount effective for forming a foam in the fluid to remove the fluid from the well, wellbore or pipeline.

The amount of alcohol ether sulfonate in the composition can range from 1 wt. % to 100 wt. % based on the total weight of the composition, and the carrier can range from 0 to 99%. Preferably, the amount of alcohol ether sulfonate in the composition can range from 10 wt. % to 50 wt. % based on the total weight of the composition, and the carrier can range from 50 to 90%. Most preferably, the amount of alcohol ether sulfonate in the composition can range from 5 wt. % to 70 wt. % based on the total weight of the composition, and the carrier can range from 30 to 95%.

The effective amount of the alcohol ether sulfonate required to sufficiently foam varies with the system in which it is used depending upon field conditions including temperatures and pressures of the formation or pipeline, the geological characteristics of the formation and the nature of the hydrocarbon, water or other fluid being removed or recovered. Methods for monitoring foaming rates in different systems are well known in the art and may be used to decide the effective amount of the foaming agent required in a particular situation. Preferably, the alcohol ether sulfonate can be added to the fluid in a concentration of from about 10 to about 100,000 ppm based on volume of the fluid, more preferably from about 100 to about 80,000 ppm, and most preferably from about 100 to about 50,000 ppm.

A gas can also be introduced into the well, wellbore or pipeline. The gas can comprise nitrogen, carbon dioxide, methane, ethane, propane, butane, natural gas, produced gas, or a combination thereof. A gas can be introduced, for example, when the well is a gas-lifted oil well is which the gas causes the foaming of the fluid with the aid of the alcohol ether sulfonate.

The composition and the gas can be injected sequentially into the well, the wellbore, or the pipeline. Alternatively, the alcohol ether sulfonate and the gas can be injected into the well, the wellbore or the pipeline simultaneously.

The composition can be introduced into the well, the wellbore or the pipeline as a batch addition. Batch treatment typically involves the application of a single volume of the composition at one time with optional post-fluid flushing such as with potassium chloride or water. The next batch would be applied after a period of time when the foamer dosage is reduced and performance may start to decline. Such known methods of introducing a batch of foaming agent into a well include batch and fall or tubing displacement methods.

Alternatively, the composition can be continuously introduced into the well, the wellbore or the pipeline when the well, the wellbore or the pipeline is in operation. For example, continuous injection would include injection of the composition into the well, wellbore or pipeline during the majority of its operation, such as during 50, 55, 60, 65, 70, 75, 80, 85, 90, 95 or 100% of the period during which it is in operation. When the composition is introduced continuously, a smaller volume of the composition is used as compared to batchwise addition.

Conventional means of introducing a foaming agent into a well, wellbore or pipeline can be used to introduce the composition in the method of the invention. For example, the composition can be introduced into the downhole end of a well, such as by injecting the composition down a capillary string or a casing/tubing annulus, via gas lift or umbilical cord. Gas lift techniques are well known and are used to obtain additional production when wells become liquid loaded. Gas injected into the production tubing reduces the hydrostatic pressure of the fluid column. The reduction in downhole pressure allows the fluids in the well to enter the wellbore at a higher flow rate. The skilled person would know how to determine gas-lift valve position, operating pressure, and gas injection rate by specific well conditions.

The foam can be formed in situ. For example, a foam can be formed by introducing alternating slugs of gas and foam forming composition into the well, wellbore or pipeline. Alternatively, a foam can be formed from contact with natural gas within the well itself. Thus, conventional means can be used for foaming the composition.

When the fluid of the composition is a hydrocarbon, the hydrocarbon can comprise an oil or gas, such as crude oil, refined oil, or natural gas condensate.

The hydrocarbon fluid can be a naturally present liquid in a gas well or an oil well, such as natural gas condensate from a gas well or crude oil from a gas-lifted oil well.

Unless otherwise indicated, an "alkyl" group as described herein alone or as part of another group is an optionally substituted linear saturated monovalent hydrocarbon radical containing from one to twenty carbon atoms and preferably one to twelve carbon atoms, or an optionally substituted branched saturated monovalent hydrocarbon radical containing three to twenty carbon atoms, and preferably three to eight carbon atoms. The term "lower alkyl" is an optionally substituted linear saturated monovalent hydrocarbon radical containing from one to six carbon atoms, or an optionally substituted branched saturated monovalent hydrocarbon radical containing three to six carbon atoms. Examples of unsubstituted lower alkyl groups include methyl, ethyl, n-propyl, i-propyl, n-butyl, i-butyl, s-butyl, t-butyl, n-pentyl, pentyl, s-pentyl, t-pentyl, and the like.

The term "-ene" as used as a suffix as part of another group denotes a bivalent radical in which a hydrogen atom is removed from each of two terminal carbons of the group, or if the group is cyclic, from each of two different carbon atoms in the ring. For example, alkylene denotes a bivalent alkyl group such as ethylene (—$CH_2CH_2$—) or isopropylene (—$CH_2(CH_3)CH_2$—). For clarity, addition of the ene suffix is not intended to alter the definition of the principal word other than denoting a bivalent radical. Thus, continuing the example above, alkylene denotes an optionally substituted linear saturated bivalent hydrocarbon radical.

Having described the invention in detail, it will be apparent that modifications and variations are possible without departing from the scope of the invention defined in the appended claims.

EXAMPLES

The following non-limiting examples are provided to further illustrate the present invention.

Example 1: Compatibility with Brine Solution

Water encountered in the oil and gas production could have a wide range of total dissolved solid (TDS) ranging from condensation water with minimum salt content to high salinity brine with greater than 20% TDS. To ensure robust foaming performance of the compositions in these fluids, the composition is formulated to be compatible with typical oil field brines. Thus, the compatibility of various compositions described herein with a brine solution was investigated. Conventional olefin sulfonate foaming agents were also tested for comparison, including dodecene-1-sulfonic acid which is currently considered best-in-class anionic foaming agent.

The test brine solution was prepared by dissolving 10.2 wt. % sodium chloride and 3.7 wt. % $CaCl_2 \cdot 2H_2O$ in deionized water. Stock solutions of 1.0% alcohol ether sulfonate of formula (I) were prepared in deionized water, and were mixed in the brine solution in concentrations of 400 ppm, 800 ppm and 1600 ppm alcohol ether sulfonate. After thorough mixing of the stock solution with the brine solution, the appearance of the mixture was noted. Any sign of cloudiness, precipitation or sediment indicated incompatibility. Table 1 summarizes the compatibility testing results.

Product 1 is an alcohol ether sulfonate of formula (II):

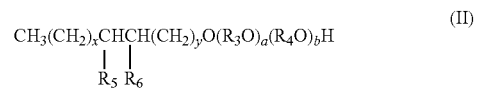

(II)

wherein a is 18, b is 2, M is sodium, x is 7, y is 8, $R_3$ is isopropylene, $R_4$ is ethylene, $R_5$ is hydroxyl and $R_6$ is —$SO_3M$, or $R_5$ is —$SO_3M$ and $R_6$ is hydroxyl. Product 2 is an alcohol ether sulfonate of formula (II) wherein a is 18, b is 4, M is sodium, x is 7, y is 8, $R_3$ is isopropylene, $R_4$ is ethylene, $R_5$ is hydroxyl and $R_6$ is —$SO_3M$, or $R_5$ is —$SO_3M$ and $R_6$ is hydroxyl.

TABLE 1

Compatibility test results of alcohol ether sulfonates as compared to conventional olefin sulfonates with the test brine solution at room temperature.

| Olefin Sulfonate Class | Foaming Agent | 400 ppm | 800 ppm | 1600 ppm |
|---|---|---|---|---|
| Alpha Olefin Sulfonate | Sodium salt of dodecene-1-sulfonic acid | Slightly hazy liquid | Slightly hazy liquid | Liquid with sediment at bottom |
| Alpha Olefin Sulfonate | Sodium $C_{14}$-$C_{16}$ Olefin Sulfonate | Cloudy liquid with precipitation | Cloudy liquid | Cloudy liquid |
| Internal Alpha Olefin Sulfonate | Mixture of sodium salts of $C_{15}$-$C_{20}$ alkane hydroxy sulfonic acid and $C_{15}$-$C_{20}$ alkene sulfonic acid | Cloudy liquid | Cloudy liquid with precipitation | Cloudy liquid with precipitation |
| Internal Alpha Olefin Sulfonate | Mixture of sodium salts of $C_{10}$-$C_{18}$ alkane hydroxy sulfonic acid and $C_{10}$-$C_{18}$ alkene sulfonic acid | Cloudy liquid with precipitation | Cloudy liquid with precipitation | Cloudy liquid with precipitation |
| Alcohol ether sulfonate | Product 1 | Clear liquid | Clear liquid | Clear liquid |
| Alcohol ether sulfonate | Product 2 | Clear liquid | Clear liquid | Clear liquid |

Conventional alpha olefin sulfonates such as a sodium salt of dodecene-1-sulfonic acid is not compatible with the brine solution at 400 ppm, 800 ppm and 1600 ppm. Similarly, longer chain alpha olefin sulfonates such as sodium $C_{14}$-$C_{16}$ olefin sulfonate are not compatible with the brine solutions. Internal alpha olefin sulfonates such as sodium salts of $C_{15}$-$C_{20}$ alkane hydroxy sulfonic acid and $C_{15}$-$C_{20}$ alkene sulfonic acid and a mixture of sodium salts of $C_{10}$-$C_{15}$ alkane hydroxy sulfonic acid and $C_{10}$-$C_{15}$ alkene sulfonic acid also demonstrated incompatibility with the brine solution. In contrast, 400 ppm, 800 ppm and 1600 ppm active solutions of products 1 or 2 in the brine solution showed good compatibility and the resultant solution mixtures were crystal clear liquids.

Example 2: Liquid Unloading Efficiency

The unloading efficiency of the foaming agents was determined using a dynamic foaming test apparatus. A dynamic foam test cell was used to measure in real-time the liquid unloading efficiency of the compositions and the conventional foaming agents at temperatures up to 190° F. The test cell included a nitrogen supply; a jacketed 1,000 ml graduated cylinder with a glass frit (with medium porosity, 10-20 μm) on the bottom for nitrogen gas sparge flow; a flow meter; a temperature-controlled water bath; a container for collecting unloaded liquid; a condenser for transporting the liquid from a cylinder to another container; and a balance connected to a computer for recording real-time measurements. The nitrogen gas flow rate was held constant at 7 liters per minute.

The dynamic foaming test uses 100 grams of liquid sample with 400 ppm active foaming agent in a brine solution containing 10.2 wt. % sodium chloride and 3.7 wt. % $CaCl_2 \cdot 2H_2O$. The test fluid is slowly poured into the graduated cylinder. The nitrogen gas flow through the frit glass generates the foam and unloading occurs. The percent liquid unloading efficiency was calculated by dividing the weight of the collected liquid in the container at 15 minutes (i.e., the amount overflowed) by the initial weight placed in the cylinder (100 grams) times 100. The results are shown in Table 2.

TABLE 2

Dynamic foaming testing results of 400 ppm active foaming agent in brine solution.

| Foaming Agent | Liquid Unloading Efficiency (wt. %) |
|---|---|
| Sodium salt of dodecene-1-sulfonic acid | 61.18% |
| Sodium $C_{14}$-$C_{16}$ Olefin Sulfonate | 0% |
| Mixture of sodium salts of $C_{15}$-$C_{20}$ alkane hydroxy sulfonic acid and $C_{15}$-$C_{20}$ alkene sulfonic acid | 0% |
| Mixture of sodium salts of $C_{10}$-$C_{18}$ alkane hydroxy sulfonic acid and $C_{10}$-$C_{18}$ alkene sulfonic acid | 0% |
| Product 1 | 78.48% |
| Product 2 | 68.25% |

The best-in-class AOS, dodecene-1-sulfonic acid, sodium salt solution, exhibited good effectiveness in foaming the brine solution by generating 61.18% unloading efficiency. The longer chain AOS sodium $C_{14}$-$C_{16}$ olefin sulfonate and internal AOSs did not exhibit any unloading efficiency. Products 1 and 2 demonstrated superior foaming performance under similar conditions with 78.48% and 68.25% respectively.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and methods without departing from the scope of the invention, it is intended that all matter contained in the above description and shown in the accompanying drawing shall be interpreted as illustrative and not in a limiting sense.

What is claimed is:

1. A method of removing a fluid from a gas or oil well, a wellbore, or a pipeline, the method comprising:
    introducing a composition into a gas well, an oil well, a wellbore, or a pipeline in an amount effective for foaming a fluid within the well, the wellbore, or the pipeline to recover the fluid from the well or the pipeline, the fluid comprising a hydrocarbon, water or a combination thereof, and the composition comprising an alcohol ether sulfonate having formula I:

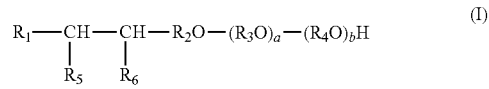

wherein:
    $R_1$ is alkyl;
    $R_2$ is alkylene;
    $R_3$ and $R_4$ are each independently ethylene or propylene;
    $R_5$ is hydroxyl and $R_6$ is —$SO_3M$, or $R_5$ is —$SO_3M$ and $R_6$ is hydroxyl;
    M is independently an alkali metal, an alkaline earth metal, hydronium, $NH_3$ or $NH_2$; and
    a and b are each independently an integer from 0 to 30, and a+b equals 1 to 60.

2. The method of claim 1, wherein the alcohol ether sulfonate has the formula II

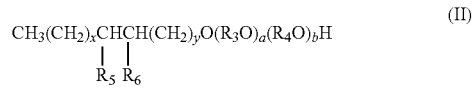

wherein:
    $R_3$ is isopropylene and $R_4$ is ethylene, or $R_3$ is ethylene and $R_4$ is isopropylene;
    $R_5$ is hydroxyl and $R_6$ is —$SO_3M$, or $R_5$ is —$SO_3M$ and $R_6$ is hydroxyl;
    M is independently Na, K, Ca, Mg, hydronium, $NH_3$ or $NH_2$;
    x and y are each independently an integer from 0 to 27, and x+y equals 5 to 27; and
    a and b are each independently an integer from 0 to 30, and a+b equals 1 to 60.

3. The method of claim 1, wherein $R_3$ is isopropylene and $R_4$ is ethylene.

4. The method of claim 1, wherein $R_5$ is hydroxyl and $R_6$ is —$SO_3M$.

5. The method of claim 1, wherein $R_5$ is —$SO_3M$ and $R_6$ is hydroxyl.

6. The method of claim 2, wherein the alcohol ether sulfonate has the formula II, x and y are each independently an integer from 0 to 15, and x+y equals 5 to 15.

7. The method of claim 2, wherein a is 2 to 25, b is 2 to 25, and a+b equals 4 to 50.

8. The method of claim 2, wherein a is 3 to 20, b is 6 to 20, and a+b equals 9 to 40.

9. The method of claim 2, wherein a is 5 to 18, b is 10 to 12, and a+b equals 15 to 30.

10. The method of claim 1, wherein the composition further comprises a carrier comprised of water, an alcohol, an ether, a glycol, a glycol ether, or a combination thereof.

11. The method of claim 1, wherein the carrier comprises methanol, ethanol, isopropanol, butoxyethanol, ethylene glycol, propylene glycol, methyl ether ethylene glycol, naphtha, diesel, toluene, ethylenebenzene, ethylene glycol monobutyl ether, xylene, or a combination thereof.

12. The method of claim 1, further comprising injecting an additional anionic surfactant, a cationic surfactant, a nonionic surfactant, an amphoteric surfactant, or a zwitterionic surfactant into the well, the wellbore or the pipeline.

13. The method of claim 1, further comprising injecting a corrosion inhibitor, a scale inhibitor, an emulsifier, a water clarifier, a dispersant, an emulsion breaker, a hydrogen sulfide scavenger, a gas hydrate inhibitor, a biocide, a pH modifier, a synergistic compound, an asphaltene inhibitor, a paraffin inhibitor, an antioxidant, a pour point depressant, a viscosity modifier, a flow back aid, a friction reducer, a crosslinking agent, or a proppant into the well, the wellbore or the pipeline.

14. The method of claim 1, wherein the well or wellbore is within a subterranean hydrocarbon-containing formation comprising a sandstone reservoir or a carbonate reservoir.

15. The method of claim 1, further comprising injecting a gas into the well, the wellbore or the pipeline.

16. The method of claim 15, wherein the gas comprises nitrogen, carbon dioxide, methane, ethane, propane, butane, natural gas, produced gas, or a combination thereof.

17. The method of claim 1, wherein the composition is injected into the well, the wellbore or the pipeline as a batch addition.

18. The method of claim 1, wherein the composition is continuously injected into the well, the wellbore or the pipeline when the well, the wellbore or the pipeline is in operation.

19. The method of claim 1, wherein the hydrocarbon comprises oil or natural gas condensate.

20. The method of claim 1, wherein the alcohol ether sulfonate is added to the fluid in a concentration of from about 10 to about 100,000 ppm based on volume of the fluid.

21. The method of claim 20, wherein the alcohol ether sulfonate is added to the fluid in a concentration of from about 100 to about 50,000 ppm based on volume of the fluid.

* * * * *